(12) United States Patent
Zhu et al.

(10) Patent No.: US 11,615,634 B2
(45) Date of Patent: Mar. 28, 2023

(54) CHARACTER RECOGNITION OF LICENSE PLATE UNDER COMPLEX BACKGROUND

(71) Applicant: International Business Machines Corporation, Armonk, NY (US)

(72) Inventors: Sheng Nan Zhu, Shanghai (CN); Guoqiang Hu, Shanghai (CN); Yuan Yuan Ding, Shanghai (CN); Peng Ji, Nanjing (CN); Fan Li, Shanghai (CN); Jian Xu, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/365,045

(22) Filed: Jul. 1, 2021

(65) Prior Publication Data

US 2023/0004747 A1  Jan. 5, 2023

(51) Int. Cl.
*G06V 20/62* (2022.01)
*G06K 9/62* (2022.01)
(Continued)

(52) U.S. Cl.
CPC ............ *G06V 20/63* (2022.01); *G06K 9/628* (2013.01); *G06K 9/6268* (2013.01); *G06N 3/08* (2013.01); *G06V 30/153* (2022.01); *G06V 30/10* (2022.01)

(58) Field of Classification Search
CPC ...... G06K 9/628; G06K 9/6268; G06V 20/62; G06V 30/10; G06V 20/63; G06V 30/153
See application file for complete search history.

(56) References Cited

U.S. PATENT DOCUMENTS

| | | | | |
|---|---|---|---|---|
| 5,559,902 A | * | 9/1996 | Bose ................... | G06K 9/6297 382/262 |
| 6,473,517 B1 | * | 10/2002 | Tyan ................... | G06V 30/153 382/105 |

(Continued)

FOREIGN PATENT DOCUMENTS

| CN | 101398894 B | 12/2011 |
|---|---|---|
| CN | 102496019 A | 6/2012 |

(Continued)

OTHER PUBLICATIONS

Karthikeyan et al. "Vehicle License Plate Character Segmentation a Study." International Journal of Computer and Electronics Research; http://ijcer.org. Feb. 2013. 8 pages. vol. 2, Issue 1.

(Continued)

*Primary Examiner* — Margaret G Mastrodonato
(74) *Attorney, Agent, or Firm* — Scully, Scott. Murphy & Presser, P.C.; Joseph Petrokaitis

(57) ABSTRACT

A system, method, and computer program product provides a way to separate connected or adhered adjacent characters of a digital image for license plate recognition. As a threshold processing, the method performs a recognition of character adhesion by obtaining character parameters using an image processor. The parameters include a horizontal max crossing and a ratio of width and height. A first rule-based module is used responsive to the character parameters to distinguish the adhered characters (character adhesions) that are easy to judge, leaving the uncertain part to a character adhesion classifier model for discrimination. Character adhesion data is obtained by data augmentation including the adding of a random distance between two single characters to create class like adhered characters. Then the character adhesion classifier model of single character and character adhesion data is trained. Any uncertain part can be (Continued)

distinguished by the trained character adhesion classifier model.

19 Claims, 11 Drawing Sheets

(51) Int. Cl.
   *G06N 3/08* (2023.01)
   *G06V 30/148* (2022.01)
   *G06V 30/10* (2022.01)

(56) References Cited

U.S. PATENT DOCUMENTS

| | | | |
|---|---|---|---|
| 2012/0106802 A1* | 5/2012 | Hsieh | G06V 20/63 |
| | | | 382/105 |
| 2013/0279759 A1* | 10/2013 | Kagarlitsky | G06V 10/751 |
| | | | 382/105 |
| 2014/0301606 A1 | 10/2014 | Paul et al. | |
| 2020/0226400 A1* | 7/2020 | Corring | G06V 10/22 |
| 2022/0101037 A1* | 3/2022 | Chua | G06K 9/6277 |

FOREIGN PATENT DOCUMENTS

| | | |
|---|---|---|
| CN | 102708356 A | 10/2012 |
| CN | 105260735 A | 1/2016 |
| CN | 105447489 A | 3/2016 |

OTHER PUBLICATIONS

Li et al. "Towards End-to-End Car License Plates Detection and Recognition with Deep Natural Networks." IEEE Transactions on Intelligent Transportation Systems. Submitted Apr. 5, 2017 and revised Sep. 26, 2017. 9 pages.

Xie et al. "A Robsut License Plate Detection and Character Recognition Algorithm Based on a Combined Feature Extraction Model and BPNN." Journal of Advanced Transportation; DOI:10.1155/2018/6737314. Sep. 26, 2018. 16 pages.

* cited by examiner

CHARACTER RECOGNITION OF LICENSE PLATE UNDER COMPLEX BACKGROUND

BACKGROUND

The present disclosure relates to systems and methods for recognizing license plate characters.

Character recognition of license plates in natural scene images remains challenging due to the following facts:

1) In one instance, the main problem is lack of license plate data of a particular jurisdiction. Due to easy access to public binary char data, a classical algorithm for single character recognition after segmentation is adopted to solve the problem.

2) Following use of the classical algorithm, character adhesion caused by low-resolution, distortion, etc. often happens in segmentation and makes the recognition difficult.

Moreover, diverse fonts and unfixed font spacing take great challenges to the separation of character adhesion in license plates of certain jurisdictions.

BRIEF SUMMARY

A system, method, and computer program product described herein provide a method and framework to improve the recognition of characters adhesion by a character adhesion classifier.

The system, method, and computer program product first implements a rule-based method is used to first identify the characters adhesion based on one or more obtained character parameters.

Those uncertain characters will be judged subsequently by a character adhesion classifier model trained with characters adhesion data including data obtained by data augmentation.

Any adhered characters are subject to an incremental split and hard split techniques which can be combined to separate adhered characters.

In one aspect, there is provided a method implemented by at least one hardware processor comprising: receiving, at the at least one hardware processor, a digital image comprising a sequence of characters; evaluating, implementing the at least one hardware processor, the digital image to determine a connectivity of one or more adjacent characters; for connected adjacent characters, performing image processing using the at least one hardware processor to split and segment the connected characters; and performing, using the at least one hardware processor, character recognition to determine the sequence of characters including the segmented characters of the original digital image.

In a further aspect, there is provided a system comprising at least one processor comprising hardware, the at least one processor configured to: receive a digital image comprising a sequence of characters; evaluate the digital image to determine a connectivity of one or more adjacent characters; for connected adjacent characters, perform image processing to split and segment the connected characters; and perform character recognition to determine the sequence of characters including the segmented characters of the original digital image.

In some aspects, a computer readable storage medium is disclosed that includes instructions that, when executed by at least one processor including hardware, configures the at least one processor to: receive a digital image comprising a sequence of characters; evaluate the digital image to determine a connectivity of one or more adjacent characters; for connected adjacent characters, perform image processing to split and segment the connected characters; and perform character recognition to determine the sequence of characters including the segmented characters of the original digital image.

BRIEF DESCRIPTION OF THE DRAWINGS

The details of the present disclosure, both as to its structure and operation, can be understood by referring to the accompanying drawings, in which like reference numbers and designations refer to like elements.

DETAILED DESCRIPTION

The aspects disclosed herein provide a system, method, and computer program product implementing a method and framework to improve the recognition of characters adhesion by a character adhesion classifier.

The system, method, and computer program product first implements a rule-based method is used to identify the characters adhesion. Those uncertain characters will be judged subsequently by a character adhesion classifier.

The method incudes performing an incremental split method and a hard split method which may be combined to separate adhesion characters.

Figure 1:
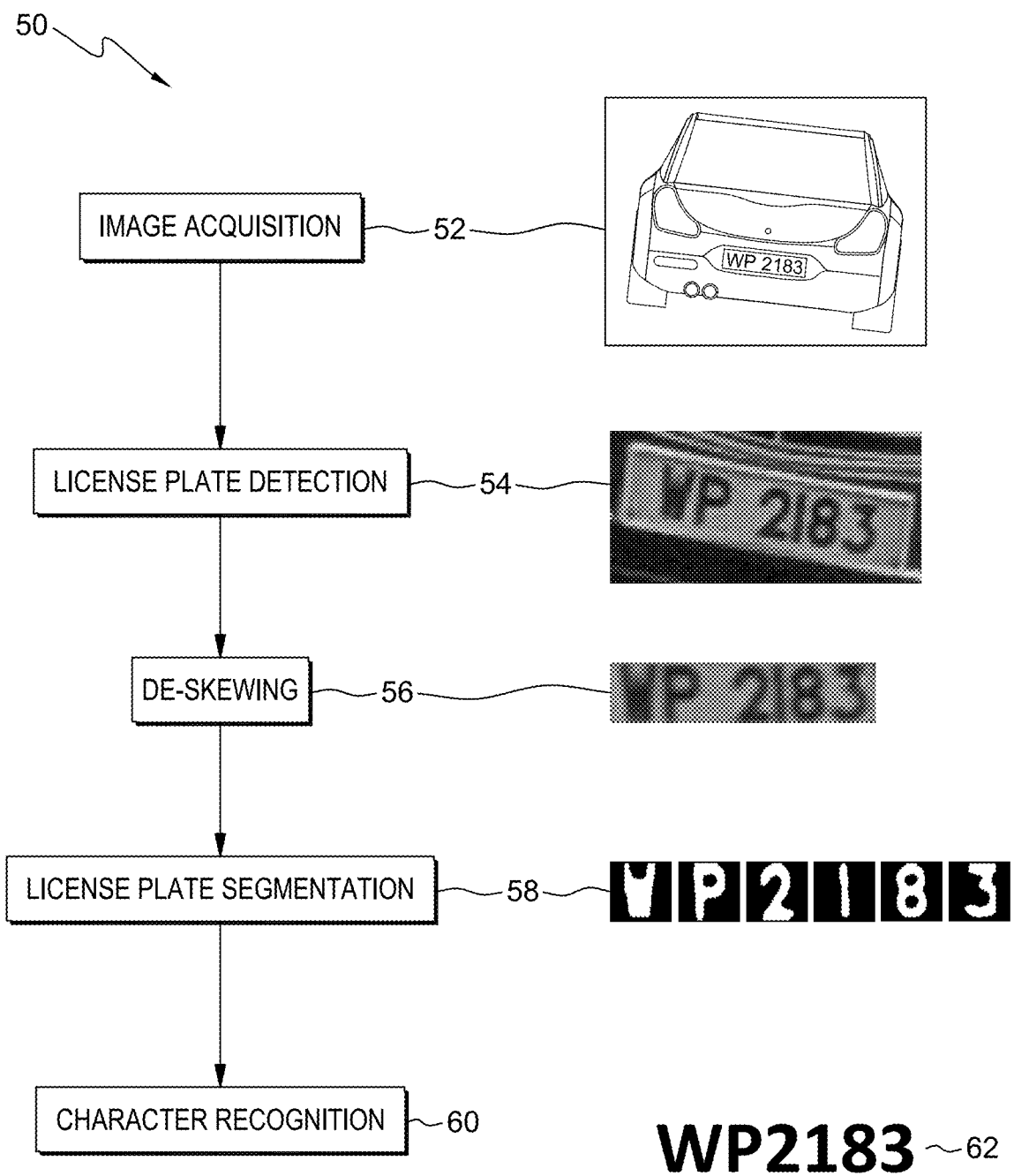
FIG. 1 shows an example methodology for recognizing characters of license plates from vehicles.

FIG. 1 shows an example methodology 50 for recognizing characters of license plates from vehicles. A first step 52 comprises the actual acquiring of an RGB image of a license plate from a subject vehicle. This may be performed by any video camera, digital camera (whether mounted or fixed in position such as a surveillance camera or a handheld mobile device, e.g., Android Smartphone) or any like device adapted to take digital images and/or collect data of license plates from roadside parking lots and streets. It is noted that images from handheld devices particularly exhibit strong variations due to the uncertain position and shooting angle of handheld devices, as well as varying illuminations, weather conditions, and different backgrounds at different hours of the day. Then, at 54, a computer-implemented algorithm is performed on the RGB image to detect the actual license plate of that vehicle. In an embodiment, at 56, FIG. 1, the image of the license plate can be initially de-skewed, e.g., to correct for horizontal tilt or vertical tilt, and at 58, an algorithm is performed to segment the actual numbers/characters of the license plate image. Then, at 60, FIG. 1, character recognition software is invoked to determine/recognize the actual characters 62 once they are split according to the embodiments herein.

Figure 2:
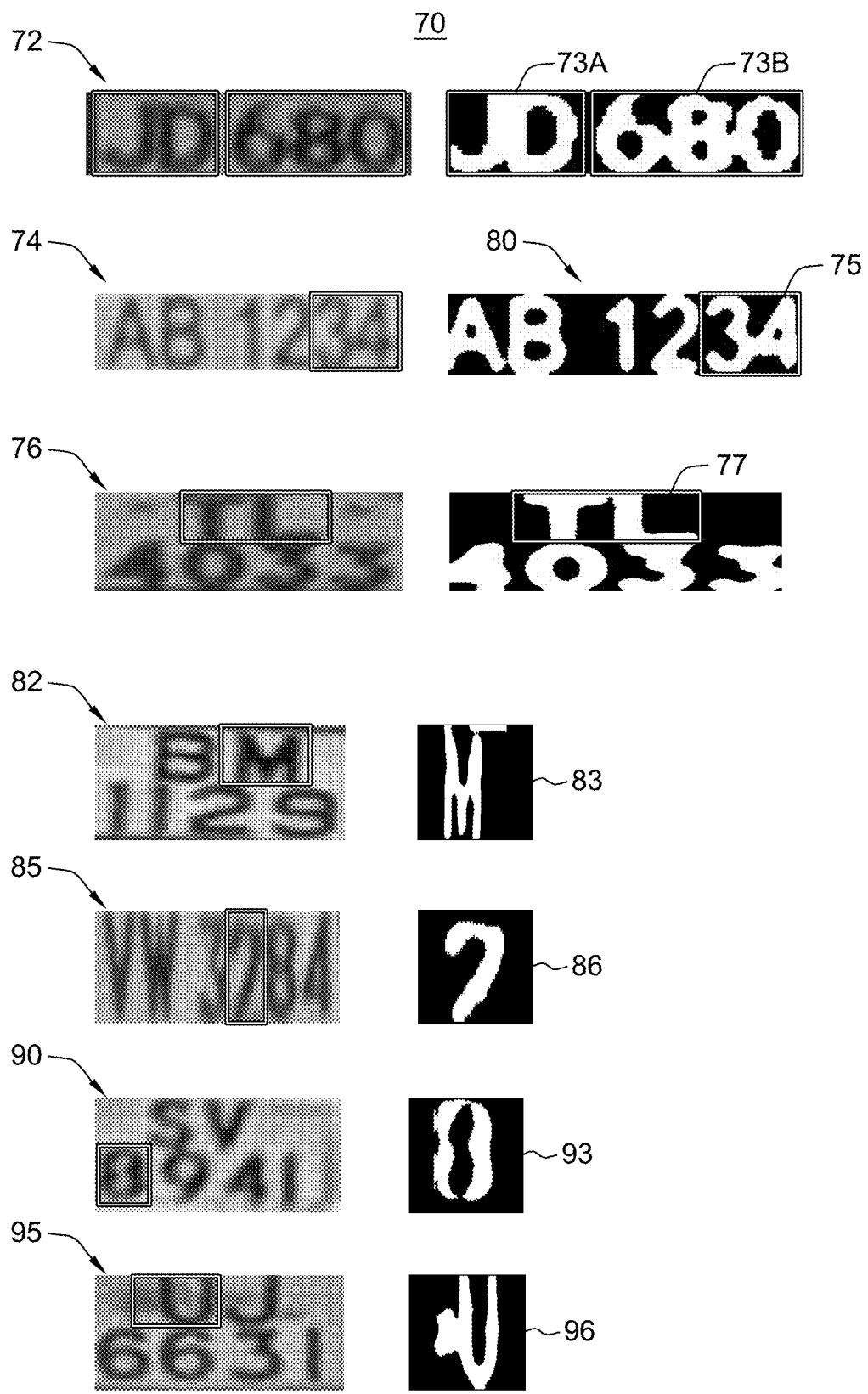
FIG. 2 shows example instances of character adhesion/disturbances in original vehicle license plate images.

FIG. 2 shows instances 70 of character adhesion which can be due to: 1) obtaining a low resolution original image 72 resulting in an evaluation of a corresponding character adhesions 73A, 73B in the resulting character sequence of the license plate image; 2) an image distortion of an original image 74 resulting in an evaluation of a corresponding character adhesions 75 in the resulting character sequence of the license plate image 80; and 3) edges 76 in the image leading to a corresponding character adhesion 77 in the resulting character sequence of the license plate image.

In addition to character adhesions, other practical challenges in license plate recognition is the presence of "noise" disturbances such as the presence of besmirch, license plate edge disturbances, blur, etc. that potentially result in character adhesions/distortions. For example, as shown in FIG. 2, an image distortion in the form of edge disturbances in respective original images 82 and 85 results in an evaluating of corresponding original unrecognizable characters 83, 86. The blurry original license plate image 90 results in distorted character sequence including a distorted character 93. The original license plate image 95 includes besmirched characters that results in distorted character sequence including distorted character 96.

Figure 3:
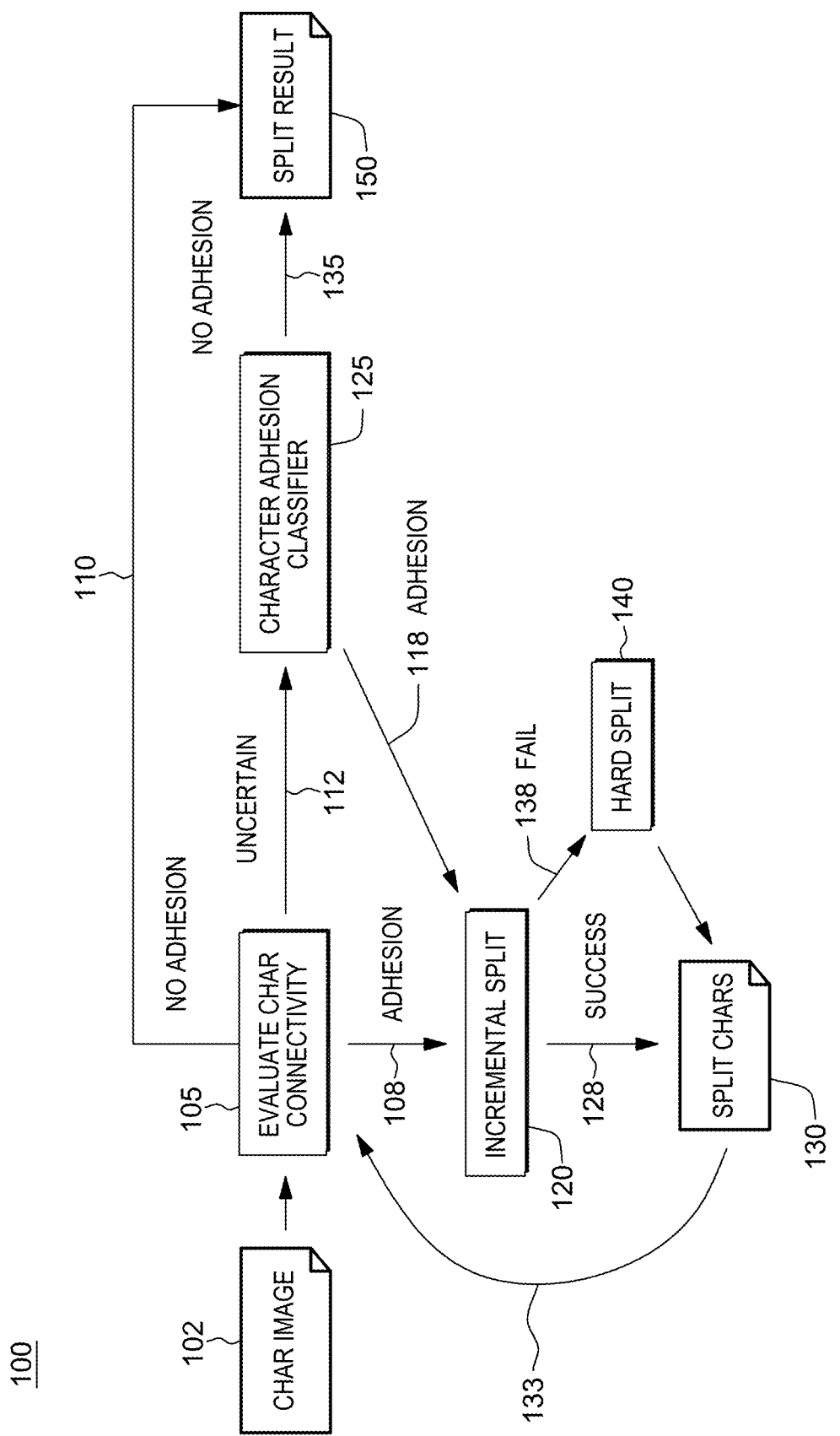
FIG. 3 depicts a character adhesion separation framework and method 100 implemented on a computer system or server, according to an embodiment.

FIG. 3 depicts a character adhesion separation framework and method 100 implemented on a computer system or server, according to an embodiment of the present invention.

At 102, FIG. 3, there is depicted the step of receiving an image of a license plate. Such an image can be obtained by a sensor device, e.g., a camera, video cam, or an Internet of Things (IoT) sensor proximately located to a vehicle and/or vehicle's license plate and which image is received as a digital file over a communications network. Based on the received image of the license plate, a rule-based method is invoked to evaluate the connectivity of the license plate characters (evaluate char connectivity). Based on the rule-based evaluation performed at 105, a determination is made as to whether the image includes adhesion, i.e., two or more characters are connected to each other, e.g., adjacent characters that overlap or have connected edges such as the image of characters "34" of license plate 74 shown in FIG. 2. If there is no character adhesion determined at 110, meaning the characters are clearly separated and the certainty of the characters is ascertainable, then the process proceeds to 150 to determine the resulting characters from the initial image as each character of the license plate character sequence is clearly separate and delineated (not adhered) and in suitable for determination. Returning to 105, FIG. 3, the rule-based evaluation may still reveal at 112 that the characters themselves are not clear or it is uncertain whether character adhesion is present or not in the character sequence, i.e., the uncertain part does not satisfy the rule-based method. In this scenario, a trained character adhesion classifier is invoked at 125 which character adhesion classifier is trained to distinguish or discriminate a single character from character adhesion. That is, the character adhesion classifier detects adhesion characters and enables the isolation and/or identifying of the adhered characters in the sequence, which results in a sequence having no character adhesion at 135. If the character adhesion classifier is able to split the characters, i.e., eliminate the character adhesion or isolate the characters, then the process proceeds to step 150 in order to obtain the license plate character sequence result.

Figures 4A, 4B, 5:
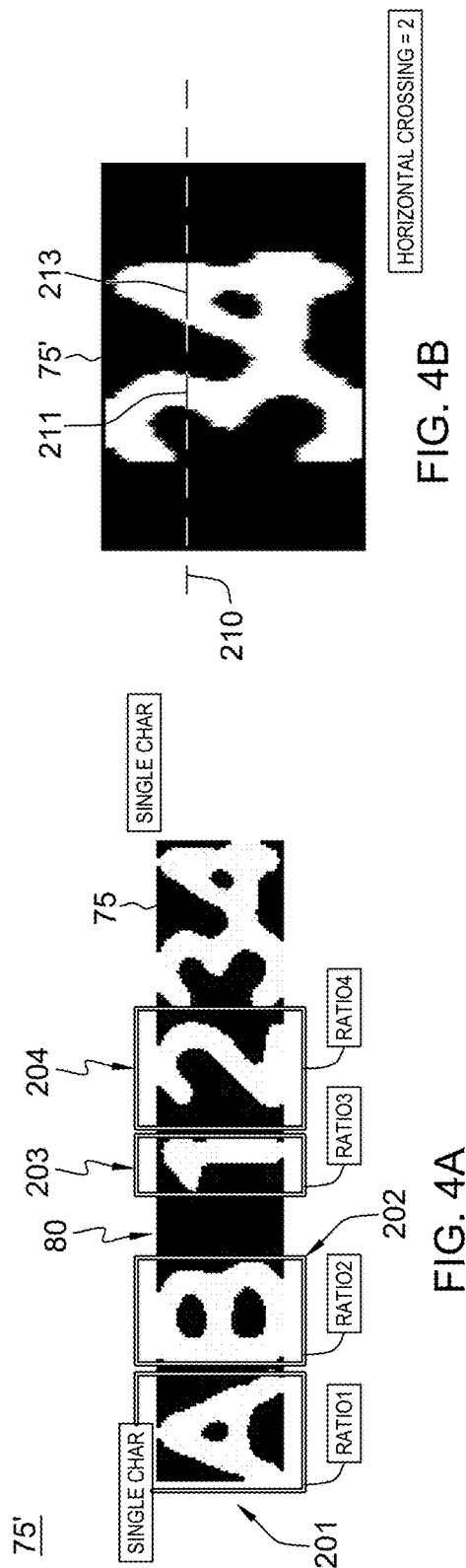
FIG. 4A shows an example evaluation of character connectivity using a rule-based method in an embodiment.
FIG. 4B shows an example overlaying of a horizontal line to determine a maximum crossing parameter in an evaluation of adhered characters of an original character sequence in an embodiment.
FIG. 5 shows a table depicting the relationship between the determined parameters resulting from the analysis of the evaluated characters of the license plate image character sequence in an embodiment.

In an embodiment, as shown in FIG. 4A, the evaluating of char connectivity using a rule-based method performed at 105, FIG. 3 involves first determining of or isolating the identity of individual characters of the license plate image character sequence. For example, as shown in the license plate image character sequence 80 example shown in FIG. 4A, the processing performed by image processing software results in determining individual characters, e.g., characters 'A', 'B', '1' '2' and '34'. Further, each isolated individual character or adhesion characters is processed to determine a variety of parameters used in the rule-based evaluation including, in an embodiment, a ratio, a mean ratio (mra) value and a maximum crossing (max crossing) value which lead to determining a connected-chars indicator(cci) for the evaluated character. For example, to determine a connected-chars indicator(cci) of a current evaluated character, there is determined for the evaluated character a max crossing, a ratio and a mean ratio (mra).

In an embodiment, shown in FIG. 4A, the current character or adhesion characters being evaluated can be aligned with respect to a reference and overlayed with a bounding box having a corresponding height and width dimension. From this bounding box, a ratio is determined, i.e., ratio(ra) =width/height of the evaluated character's corresponding bounding box. For example, in the sequence 80 shown in FIG. 4A, the box 201 bounding character 'A' has a first determined ratio (ratio 1), the box 202 bounding character 'B' has a second determined ratio (ratio 2), the box 203 bounding character '1' has a third determined ratio (ratio 3), and the box 204 bounding character '2' has a fourth determined ratio (ratio 4). A parameter mean ratio (mra) represents the mean of the ratios of the characters of ratio1, ratio2, ratio4, i.e., ratios of boxes for characters excepting for the box 203 associated with char "1". The determining of the character connectivity associated with current evaluated character/adhesion character can then be processed by determining a maximum (horizontal) crossing parameter representing a number of overlapping lines of a single horizontal line overlayed across the current evaluated character of the image.

For example, as shown in FIG. 4B, for the representation of the adhered characters 75', i.e., adjacent characters '34' of the original character sequence, a horizontal line 210 is overlayed, using image processing software, across the adhered character image portion 75' being evaluated in the license plate image character sequence. From this single line overlay 210, the processing software determines that there exists line portions 211 and 213 intersecting or crossing over portions of the adhered characters 75'. In this example, based on these intersections, it is determined that a maximum crossing of two (2) lines 211, 213 is present.

FIG. 5 shown a table 300 depicting the relationship between the determined parameters, e.g., max crossing 307, ratio 309, mra, etc. resulting from the analysis of the evaluated characters of the license plate image character sequence. For example, for an evaluated character of the image, in a first column, there is determined an associated connected-chars indicator (cci) 304 indicating whether the evaluated character is already segmented/split, is adhered to another character, or whether its adhesion status is indeterminable. For example, the cci indicator for an evaluated character can have a value of: −1 for False (i.e., no character adhesion), 0 for uncertain, 1 for True (i.e., character adhesion present). The determined cci values are determined based on rules that depend upon the respective other parameter values determined for that current evaluated character. For example, using table 300, a cci of −1 (false) is the character connectivity evaluation based on a rule corresponding to either a determination for that character a max crossing parameter of 1, or a max crossing parameter value of 2 and if the determined ratio value is less than (<) a value of a quantity of mra*C where mra is the mean ratio: mean of ratio1, ratio2, ratio4, except for char "1" and where C is an adjustable parameter, typically having a value equal to 1.

Alternatively, using table 300, a cci of 0 is a character connectivity evaluation rule corresponding to either a determination for that character of a max crossing parameter of 2 and if the determined ratio value is greater than or equal to (>=) a value of a quantity of mra*C, or that character is determined as having a max crossing parameter of 3.

Alternatively, using table 300, a cci of 1 (true) is the character connectivity evaluation rule corresponding to a determination for that character of a max crossing parameter of 4 or more.

Figure 6:
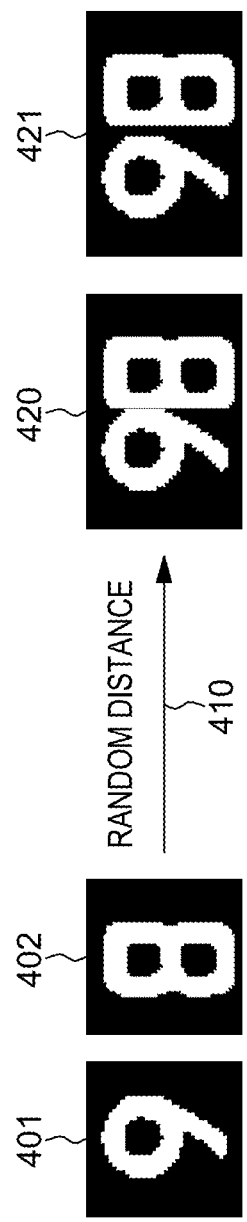
FIG. 6 shows an example of a character adhesion classifier performing a data augmentation method that can be used to create a class-like character adhesion entity in an embodiment.

In a further embodiment, shown in FIG. 6, the character adhesion classifier performs a data augmentation method that includes adding a random distance between two characters that can be used to create class like character adhesion entity. For example, for two current characters, a data augmentation is applied to make new data, e.g., make a new data class, e.g., 'zout' is a 'class like character adhesion'. As depicted in FIG. 6, a random distance can be applied between each of two (or more) characters to simulate potential adhesion characters for training, e.g., make the data more real for training purposes. For example, given adjacent characters 401, 402 as shown in FIG. 6 which are already discriminated (i.e., isolated or segmented), a random distance 410 can be added to result in a character adhesion class 420 or a character adhesion class 421, the classes 421, 422 having a respective different distance between the characters. Further types of augmentations to generate more real data for training purposes, i.e., creating classes to increase the robustness of the classifier for character recognition, can include: adding/cutting upper and lower edges (e.g., only for partial data, error case: add upper edge for "1" will result in a "T"); erasing some pixels to imitate the blur situation; or adding some random noise to a character. Each of these techniques may be used to form ground-truth labels for classifier training.

In an embodiment, in an example case of obtaining a low resolution image of a license plate, two, three, or even multiple characters may be connected (adhered). As it is difficult for data augmentation to cover all cases, the rule-based method is used to first distinguish the characters that are easy to judge at step 105, FIG. 3, leaving the uncertain part to the classifier for discrimination at 125, FIG. 3, which reduces the cost of training data augmentation.

Returning to step 105, FIG. 3, if the license plate characters evaluation reveals that character adhesion exists at 108 (i.e., cci value is +1), or alternatively, if at 112 the character adhesion evaluation determines an uncertainty (i.e., cci value is 0) and may not isolate or detect the individual characters, then the process proceeds to 120 where a method is run to incrementally split the characters of the license plate characters sequence.

At 120, an incremental split process is run to separate characters that are adhered to each other (separate adhesion).

Figure 7:
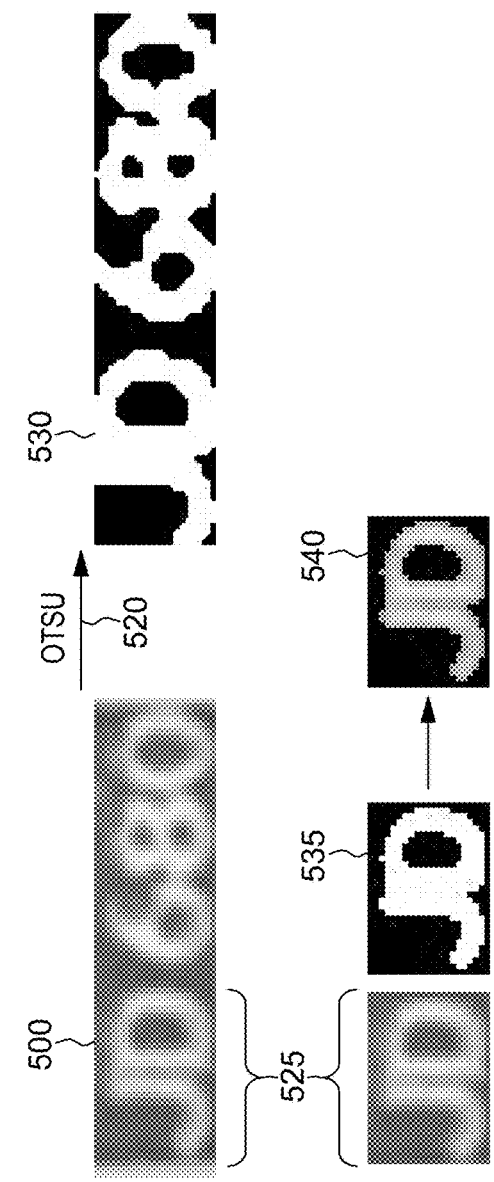
FIG. 7 shows an example original license plate image including adjacent low-resolution characters subject to an incremental split method for discriminating the characters using an image binarization method in an embodiment.
Figure 7:
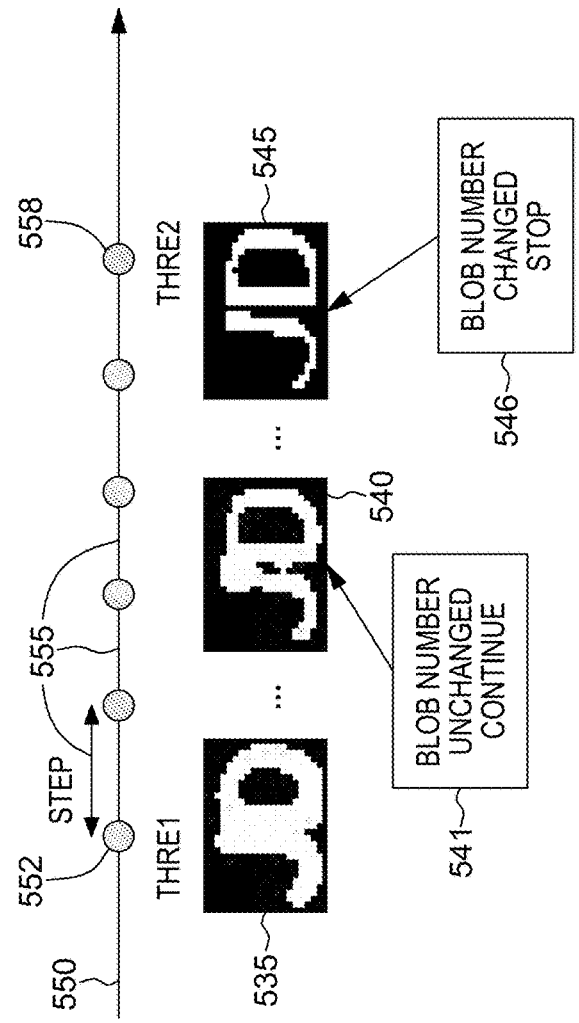

FIG. 7 shows an example original license plate image 500 including adjacent low-resolution characters 525, e.g., adjacent letters "JD", to be subject to an incremental split method for discriminating the characters using a computer vision image binarization method. In one embodiment, the classic "Otsu" image thresholding method is performed upon image 500, that, as known, runs an algorithm for separating pixels into two classes, e.g., foreground and background. In an embodiment, the Otsu method run is an adaptive thresholding method for segmentation in image processing by finding an optimal threshold value of the input image going through all possible pixel threshold values. In particular, at 120, FIG. 3, Otsu methods are run to iterate through possible threshold values and calculate a measure of spread for the pixel levels each side of the threshold, i.e., the pixels that either fall in foreground or background. In an embodiment, assuming the image is an RGB license plate image, this image can be converted into a grayscale image first. Then, statistical data of an image is used, e.g., using a historgram representation of the image. Then a threshold value is used to separate the image into two classes, e.g., a first class representing image pixel intensity values less than a threshold (e.g., image background or foreground), and a second class representing image pixel intensity values greater than a threshold (e.g., image foreground or background). Then, a "within-class" variance value indicating a distribution of the data that is a function of the pixel value, the mean pixel value of the image and the number of pixels is obtained. To obtain an optimal threshold value is to find a minimum value of within-class variance. Further, a "between-class" variance value indicating a variance between the two classes is obtained. To obtain an optimal threshold value is to find a minimum value of within-class variance or a maximum value of the "between-class" variance. The Otsu adaptive thresholding method finds an optimum threshold value, e.g., from 0 to 255 by calculating and evaluating their between-class (or within-class) variance.

As shown in FIG. 7, original image 500 having low resolution characters 525 is subject to Otsu binarization threshold processing at 520. An initial or first threshold "Thresh 1" is applied in the Otsu method resulting in a low resolution image 530 which characters are still adhered and subject to further discrimination. Upon increasing the Otsu image processing threshold, i.e., an amount of pixels >0, can result in a further image 535 which show subject characters 525 are still adhered. Applying a further threshold, e.g., "Thresh 2" eventually results in the image 540 which show characters that are separated and can be detected. Generally, thresh 2>thresh 1. In FIG. 7, a line graphic 550 depicts the application of the 'Otsu' adaptive thresholding method showing the adaptive thresholding steps 552 including first step 555 (Thresh 1) and the resulting first low-resolution image 535 corresponding to the original adhered characters 525. In the corresponding first low-resolution image 535 a number representative of the number of characters detected in the image is a 'blob' number. In the example shown, the 'blob' number is 1 as the characters is still adhered. In "incremental split" method performed, a separation is used to find the suitable threshold. The thresholding is adaptive, i.e., the steps 555 adjust the segmentation threshold dynamically in the binarization method performed. Application of a subsequent segmentation threshold at a further step 555 results in a corresponding further low-resolution image 540. The 'blob' number characterization 541 representative of the number of characters detected in the image remains unchanged, i.e., the characters are still adhered. As long as the 'blob' number does not change as the threshold changes, the number of characters does not change. Finally, as the adaptive thresholding step 555 in the Otsu method is increased, eventually a second segmentation threshold 558 is reached that results in a corresponding low-resolution image 545. However, at this threshold, the 'blob' number characterization 546 representative of the number of characters detected in the image is changed, e.g., the 'blob' number is 2 as the characters 525 in the original low-resolution image are now split at 545 and thus can be individually detected.

Referring back to FIG. 3, after performing an incremental split method at 120 such as the Otsu binarization segmentation method, if the blob number has changed before reaching an upper limit threshold, then this indicates a successful split 128 and the split characters can be determined at 130. However, if after performing an incremental split method at 120 such as the Otsu binarization segmentation method, the 'blob' number remains unchanged after reaching an upper limit threshold, then the characters are determined at 138 as not being split, and a hard split segmentation method 140 is performed.

If incremental split fails, the hard split method 140 is executed to find a gap or trough between the characters based on an x-projection representation of the original low-resolution image. In an embodiment, the 'x-project' is the number of white pixels in vertical direction. The gap is the location of a trough in the 'x-project' graph.

Figure 8:
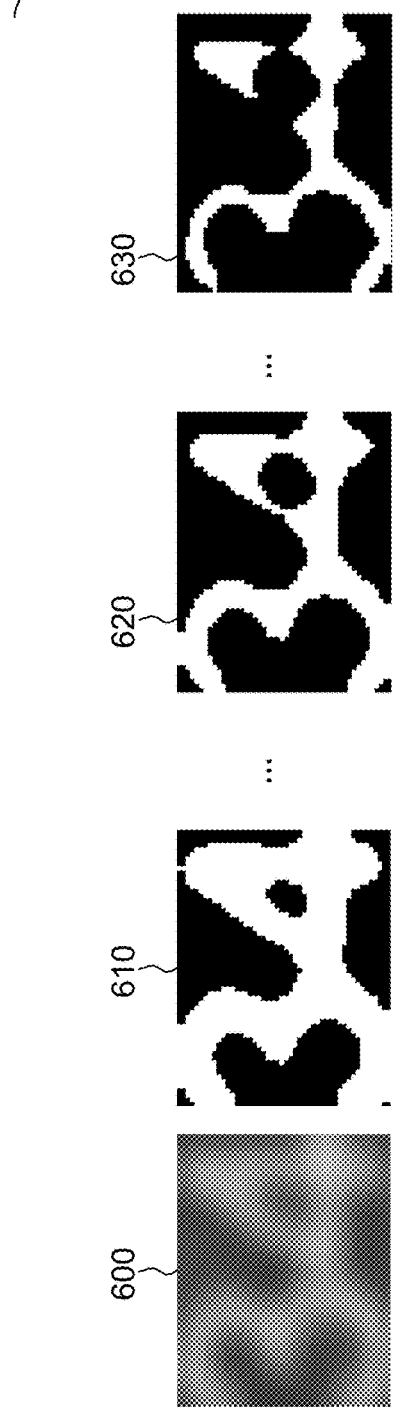
FIG. 8 shows an example application of the hard split segmentation method using x-axis projection implemented in character evaluation in an embodiment.
Figure 8:
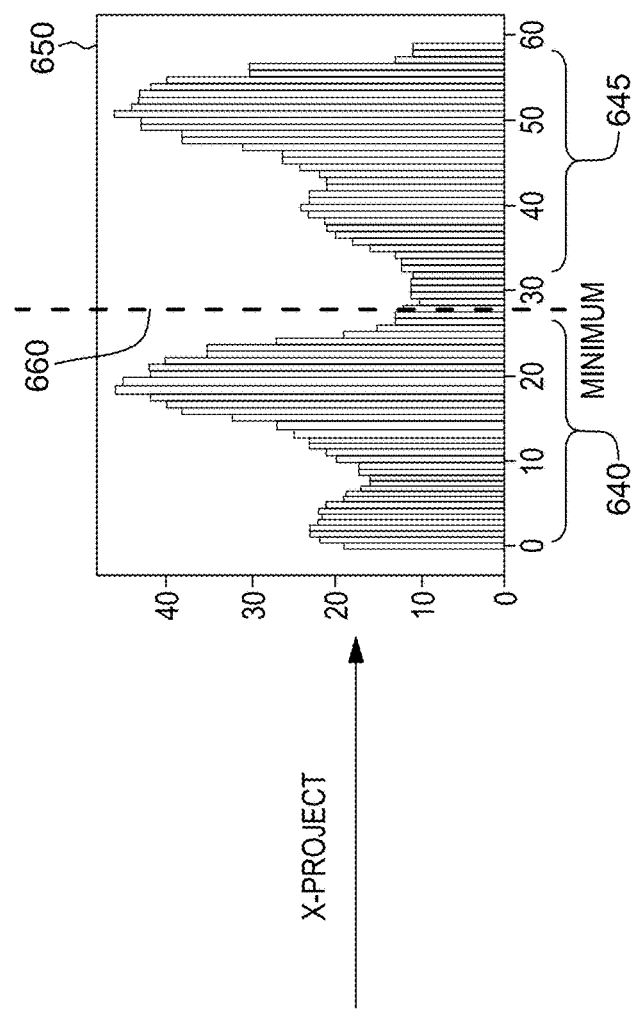
Figure 8:
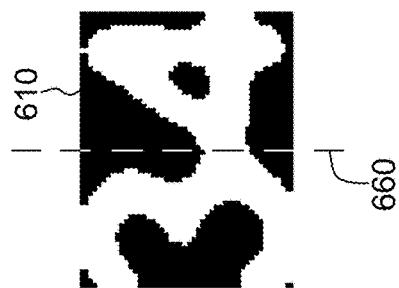

FIG. 8 show an example application of the hard split segmentation method 650. In an embodiment, this hard split segmentation method 650 occurs after the incremental split method is performed that results in the 'blob' number remaining unchanged after reaching an upper limit threshold. For example, as shown in FIG. 8, given an original low-resolution image 600 of adhered characters "34", and after applying adaptive thresholding (in the incremental split method) such as performed by the Otsu method, there is shown successive image results 610, 620, 630 after application of successive thresholds indicating that there is no threshold that can split '3' and '4' from the original image 600.

Figure 9:
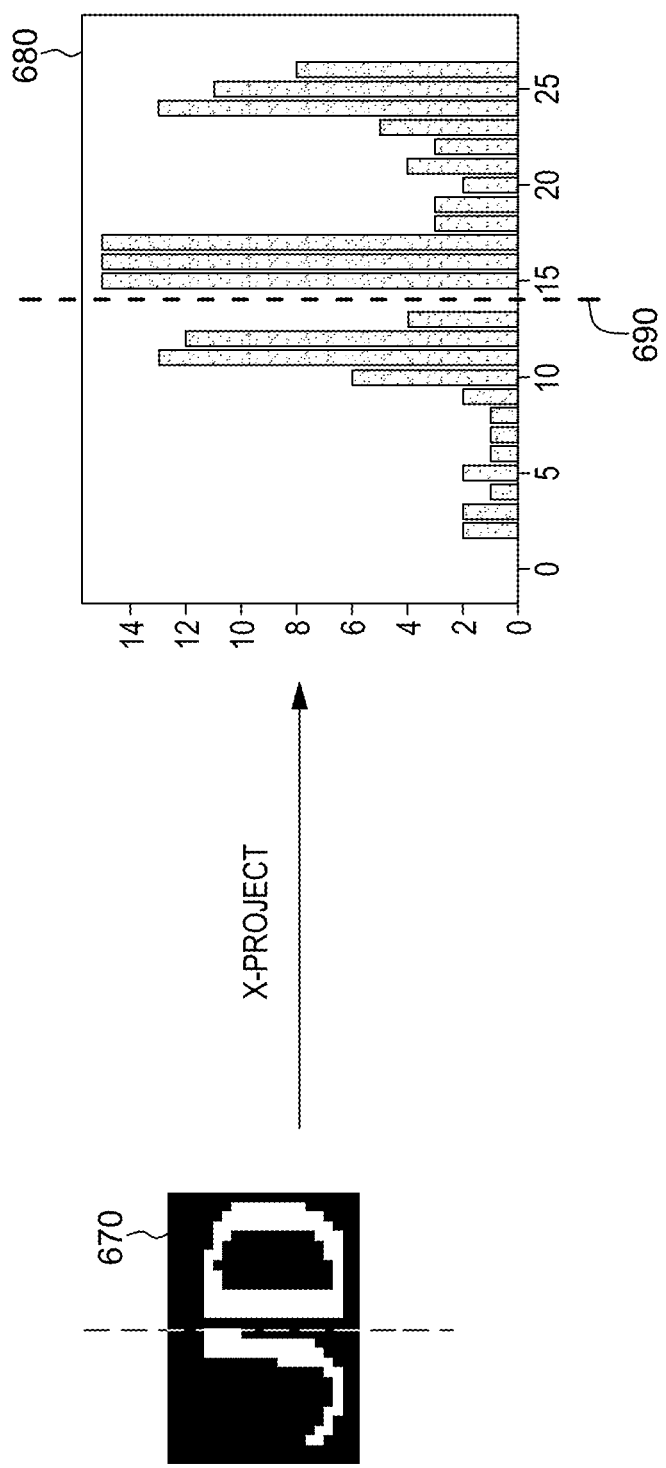
FIG. 9 depicts a further hard split segmentation method example including use of an 'x-project' showing the location of the minimum character connectivity as a gap in an embodiment.

Thus, given the adhered characters "34" resulting from the image 610 after application of the first incremental threshold, an x-project is performed that is a visualization graph 650 representing a density or concentration along the x-axis of the pixels corresponding to the adhered characters, e.g., the concentration of "white" pixels when taken against the contrasting background. In an embodiment, a vertical histogram projection of the pixels of the connected characters on an x-axis ('x-project') is performed resulting in an 'x-project' visualization graph 650 showing the adhered character '3' represented as a histogram 640, i.e., a concentration of the corresponding pixels in a vertical direction of that character taken along the x-axis, and the adhered character '4' represented as a histogram 645, i.e., a concentration of the corresponding pixels in a vertical direction of that character taken along the x-axis. The computer-implemented method then locates a local minimum or trough 660 in the visualization graph 650 which demarcates the point for character segmentation or the logical location to perform the character split. As shown in FIG. 9, an example 'x-project' 680 of the low-resolution characters "JD" 670 shows the location of the minimum character connectivity as a gap 690 corresponding to the location of the trough for use as the demarcation point for splitting the characters.

Returning back to FIG. 3, once the gap or trough location is found in the 'x-project' visualization of the characters, i.e., where the character connectivity is a minimum, then the characters can be split at 130 for character recognition. In an embodiment, the incremental split 120 and hard split 140 methods are combined together to take advantage of each other that can effectively split the characters adhesion. If upon determining a split or not at 130, the method returns at 133 to the character connectivity evaluation step 105 in order to repeat the process in the event several other characters are deemed connected, e.g., when there are more than two adjacent characters, or to repeat the process in the event character splitting is unsuccessful in the first round of processing.

Figure 10:
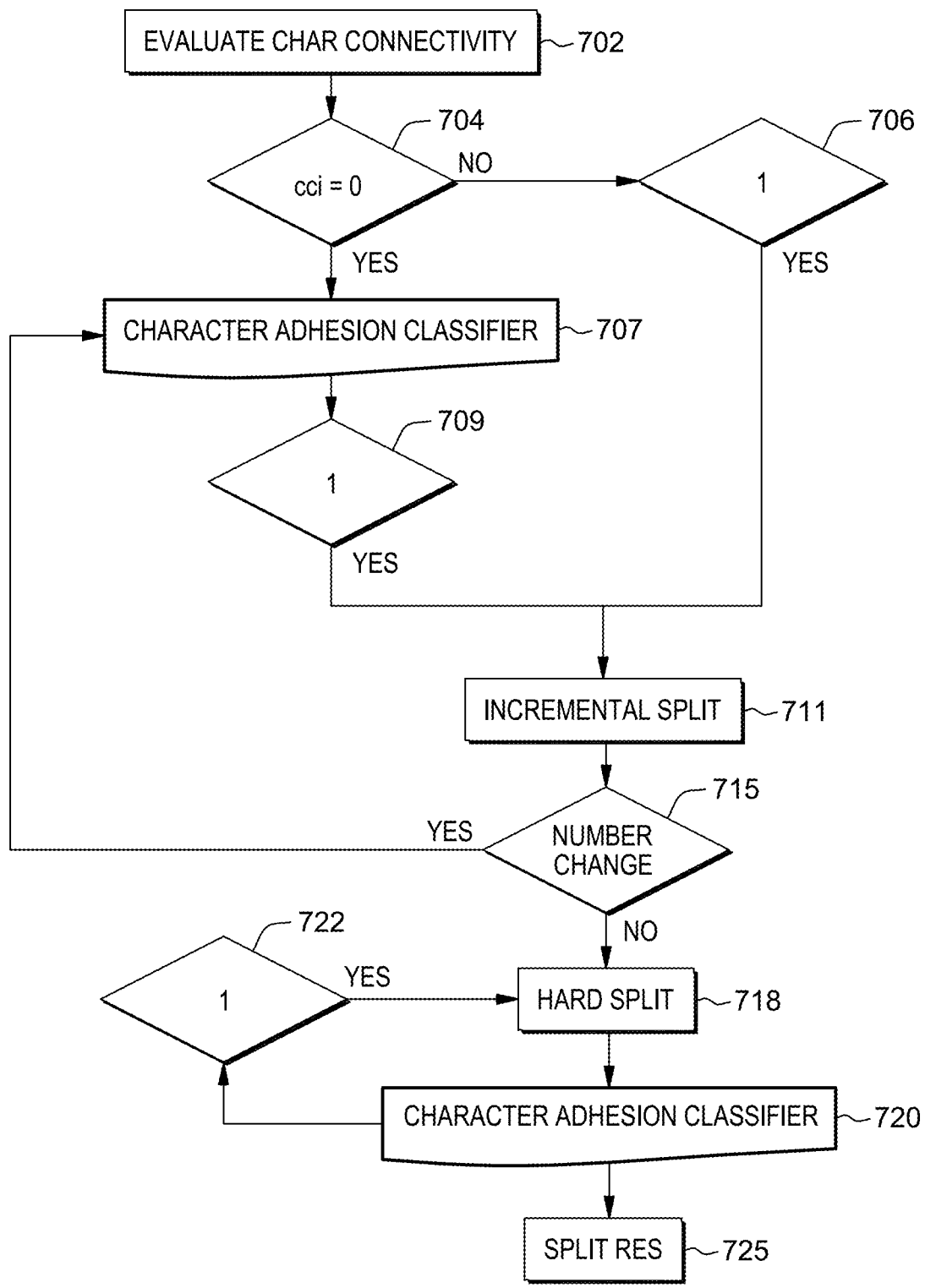
FIG. 10 depicts a general end-to-end method 700 for vehicle license plate detection and single character recognition.

FIG. 10 depicts a general end-to-end method 700 for vehicle license plate detection and single character recognition. Step 702 depicts the ability of a computer imaging method to recognize, from a digital image of a license plate, e.g., low-resolution license plate characters that may be distorted, besmirched, noisy, or generally have adhered or connected characters rendering them unrecognizable. At 704, a decision is made as to whether the license plate characters are adhered or not segmented, i.e., the connected-chars indicator or cci is −1 for False, cci=0 for uncertain, or cci=1 for True. In one embodiment, the evaluation of the license plate characters include the computing of the character 'blob''s maximum crossing (max_c) such as shown in FIG. 4B. If cci=0, then the method proceeds to step 707 to run the character adhesion classifier in order to determine whether the characters can be recognized.

In an embodiment, the character adhesion classifier is run at 707 for character discrimination when the uncertain portions cannot satisfy the rule-based methods. In an embodiment, a convolution neural network (CNN) classification model can be used to train this model, e.g., using Inception, VGG, ResNet CNN neural network model architectures, for example. This model can be trained based on a TensorFlow architecture. The training data of the model is a variety of characters including 0~9, A~Z and augmented characters that are newly created classes of adhered characters obtained by adding random distances, noise, edges, etc. However, before input to the network, the data has been binarized and converted into a binary graph. Ground-truth labels of the dataset is obtained when data is collected over time as the adhesion classifier is used. The output of the model is the recognized result of a character. Thus, the character adhesion classifier distinguishes single characters from character adhesion. If the character is a single character then it can be directly sent to next stage and if the character is adhesion, then it should be separated.

Thus, returning to step 702, FIG. 10, if the character connectivity evaluation determination results in the cci=1, then the process proceeds to 710 where the incremental split algorithm can be performed at 711. Likewise, if the character adhesion classifier result is indeterminable, i.e., at 709, FIG. 10, the method determines a connectivity evaluation of cci=1, then the process proceeds to the incremental split algorithm to be performed at 711. The adaptive incremental split algorithm of FIG. 7 is then performed at 711 and a determination is made at 715 whether the 'blob' number has changed, indicating that the characters have been suitably segmented/discretized or not. If, at 715, it is determined that the adaptive incremental split algorithm results in a 'blob' number change, then the process returns to 707 where the character adhesion classifier is again run to distinguish single characters from character adhesion.

Retuning to step 715, FIG. 10, if it is determined that the performing of the incremental split algorithm does not result in the 'blob' number changing, then the process proceeds to 718 where the hard split algorithm is performed as described herein with respect to FIGS. 8 and 9. Upon performing the hard split method, the character adhesion classifier is run at 720 for character discrimination to distinguish single character from character adhesion. A determination is made at 722, FIG. 10 as to whether a single character can be discriminated or whether further processing is necessary to isolate the characters, i.e., cci=1. If it is determined at 722 that cci=1, then the process returns to 720 to further run the hard split method to discern additional individual characters. Otherwise, the character adhesion classifier run at 720 has distinguished each single character from the adhered characters and the process proceeds to 725 indicating that all characters have been split and can be directly sent to a next stage for character recognition.

Figure 11:
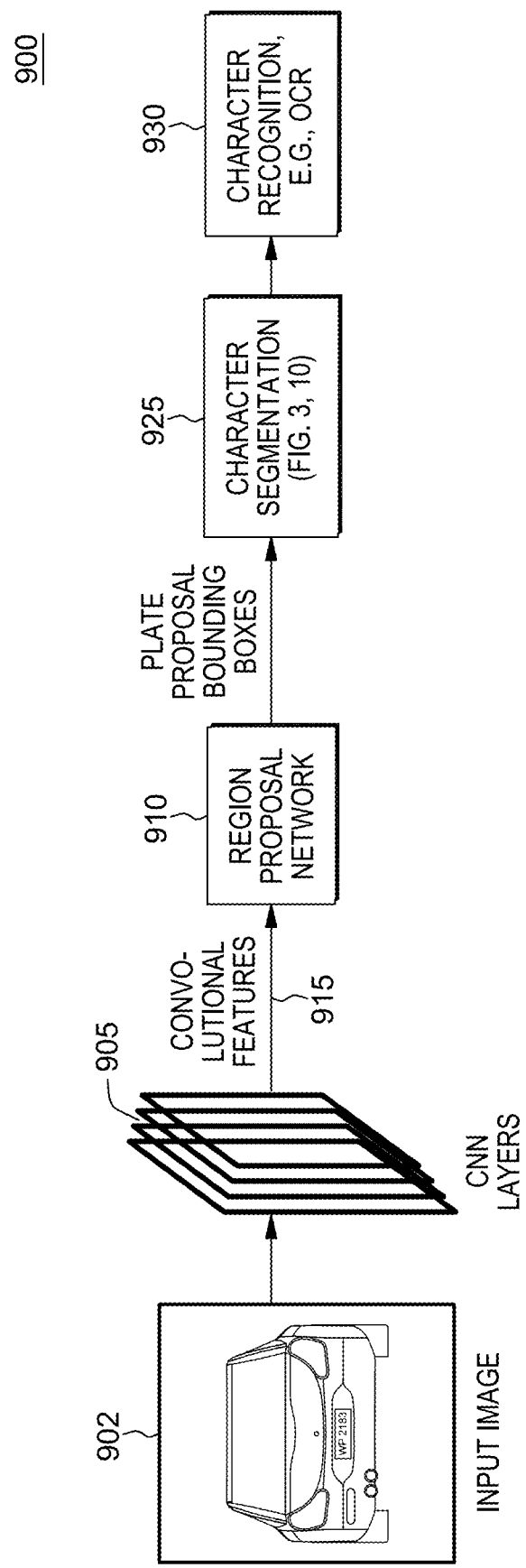
FIG. 11 shows a license plate recognition system incorporating the system and methods of character adhesion separation according to the embodiments described herein.

Both the methods depicted in FIGS. 3 and 10 significantly improve the accuracy and robustness of the character recognition model in the license plate recognition. That is, the methods of FIGS. 3 and 10 are incorporated and used in conjunction within license plate recognition system 900 such as shown in FIG. 11. In particular, FIG. 11 depicts a portion of a unified deep neural network 900, which can localize license plates in original image 902 and recognize the letters simultaneously in a single forward pass that jointly solves two separate tasks of license plate detection and recognition. In system 900 of FIG. 11, several convolutional layers 905, using a VGG network model, are used to extract low level CNN features. For example, the VGG network can consist of 13 layers of 3×3 convolutions followed by Rectified Linear Unit (ReLU) non-linearity, 5 layers of 2×2 max-pooling, and fully connected layers.

These extracted license plate features are processed in a region proposal network 910 tailored specifically for car license plates and is particularly implemented to extract the license plate candidate areas (e.g., bounding boxes) 915. From the license plate candidate areas, the character segmentation framework and methods of FIGS. 3 and 10 are implemented at 925. Finally, character recognition techniques, e.g., optical character recognition (OCR) techniques, can be employed at 930 for character recognition. Thus, rather than treating plate recognition as a sequence labeling problem such as described in a reference to Li H, Wang P, Shen C. entitled "Toward end-to-end car license plate detection and recognition with deep neural networks", IEEE Transactions on Intelligent Transportation Systems, 2018, 20(3): 1126-1136 that addresses both license plate detection and recognition using a single deep network, the system 900 of FIG. 11 incorporating the character adhesion separation framework and methods of FIGS. 3 and 10 improve the accuracy and robustness of the character recognition model in the license plate recognition significantly and can replace and/or enhance a state-of-the-art license plate recognition model that employs a sliding window manner to extract a sequence of feature vectors from license plate bounding box and that employs Recurrent Neural Networks (RNNs) with Connectionist Temporal Classification (CTC) adopted to label the sequential data and plate decoding without character separation. That is, at step 925, FIG. 11, the rule-based method is first used to identify the characters adhesion and those uncertain characters will be judged by a trained character adhesion classifier. The method provides an enhancement to the state-of-art LP recognition approaches that do not rely on heavy license plate data for model training like end-to-end neural-network models.

Figure 12:
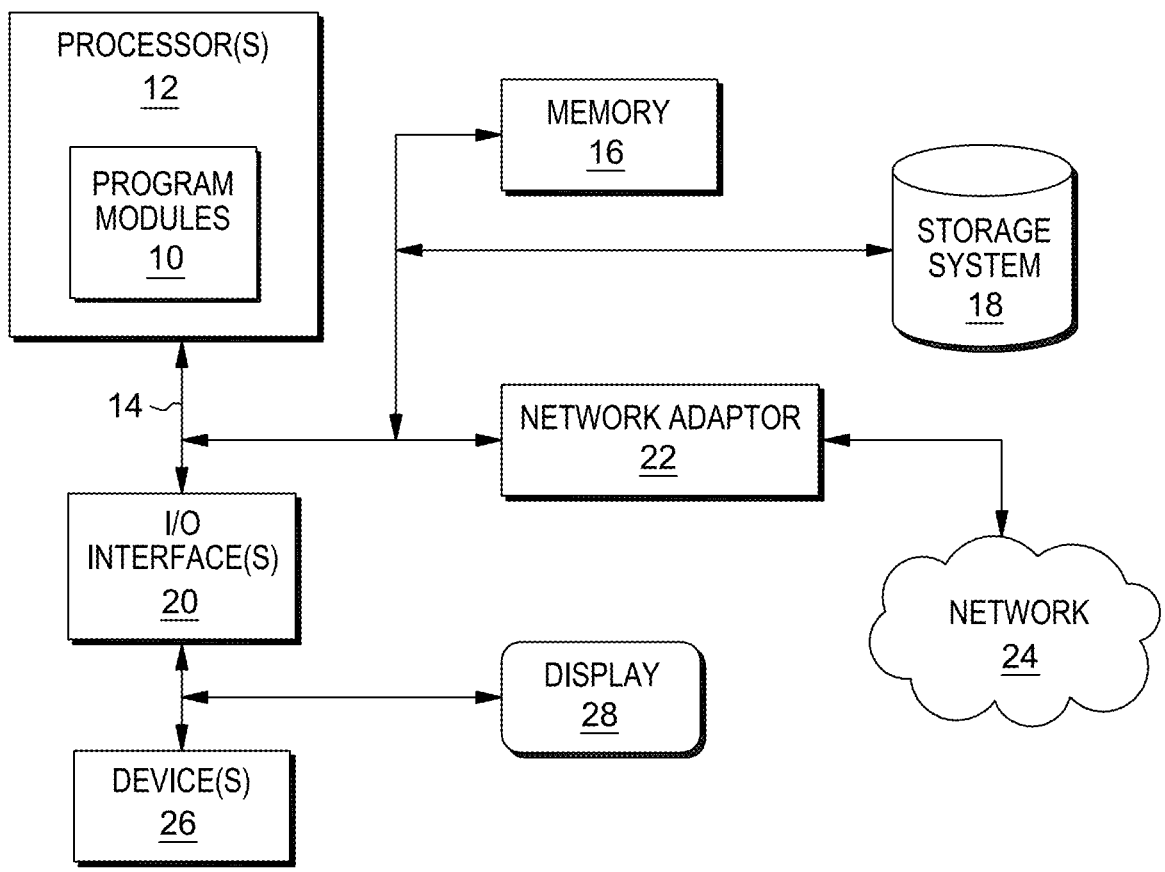
FIG. 12 is an exemplary block diagram of a computer system in which processes involved in the system, method, and computer program product described herein may be implemented.

FIG. 12 illustrates an example computing system in accordance with the present invention. It is to be understood that the computer system depicted is only one example of a suitable processing system and is not intended to suggest any limitation as to the scope of use or functionality of embodiments of the present invention. For example, the system shown may be operational with numerous other general-purpose or special-purpose computing system environments or configurations. Examples of well-known computing systems, environments, and/or configurations that may be suitable for use with the system shown in FIG. 3 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

In some embodiments, the computer system may be described in the general context of computer system executable instructions, embodied as program modules stored in memory 16, being executed by the computer system. Generally, program modules may include routines, programs, objects, components, logic, data structures, and so on that perform particular tasks and/or implement particular input data and/or data types in accordance with the present invention (see e.g., FIGS. 3, 10, 11).

The components of the computer system may include, but are not limited to, one or more processors or processing units 12, a memory 16, and a bus 14 that operably couples various system components, including memory 16 to processor 12. In some embodiments, the processor 12 may execute one or more modules 10 that are loaded from memory 16, where the program module(s) embody software (program instructions) that cause the processor to perform one or more method embodiments of the present invention. In some embodiments, module 10 may be programmed into the integrated circuits of the processor 12, loaded from memory 16, storage device 18, network 24 and/or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer system may include a variety of computer system readable media. Such media may be any available media that is accessible by computer system, and it may include both volatile and non-volatile media, removable and non-removable media.

Memory 16 (sometimes referred to as system memory) can include computer readable media in the form of volatile memory, such as random access memory (RAM), cache memory an/or other forms. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

The computer system may also communicate with one or more external devices 26 such as a keyboard, a pointing device, a display 28, etc.; one or more devices that enable a user to interact with the computer system; and/or any devices (e.g., network card, modem, etc.) that enable the computer system to communicate with one or more other computing devices. Such communication can occur via Input/Output (I/O) interfaces 20.

Still yet, the computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with the computer system. Examples include, but are not limited to: microcode, device drivers, redundant processing units, external disk drive arrays, RAID systems, tape drives, and data archival storage systems, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The corresponding structures, materials, acts, and equivalents of all elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A method implemented by at least one hardware processor comprising:
   receiving, at the at least one hardware processor, a digital image comprising a sequence of characters;
   evaluating, implementing the at least one hardware processor, the digital image to determine a connectivity of one or more adjacent characters, said evaluating the digital image comprising:
   processing, using the at least one hardware processor, the characters of the digital image to obtain character parameters; and
   generating, using the at least one hardware processor, a connection indicator value of a character as a function of said character parameters, said generated character connection indicator indicating an uncertainty as to a character being connected to another character in the sequence; and responsive to the generated character connection indicator indicating an uncertainty as to a character being connected to another adjacent character in the sequence, said method further comprising:
   running, using the at least one hardware processor, a character adhesion classifier model trained to recognize, from said image, a presence or not of connected adjacent character classes of adjacent adhered characters of the sequence; and
   for connected adjacent characters, performing image processing using the at least one hardware processor to incrementally split and segment the connected characters; and
   performing, using the at least one hardware processor, character recognition to determine the sequence of characters including the segmented characters of the original digital image.

2. The method of claim 1, wherein said
   generated character connection indicator alternately indicates the character as being one of: a segmented character in the sequence, or a character connected to another adjacent character in the sequence.

3. The method of claim 2, wherein said character parameters of a character comprises:
   a max horizontal crossing value of the character;
   a ratio value of the character, the ratio being a measure of a width/height of the character; and a means ratio being a function of the ratio of each of the characters of the sequence.

4. The method of claim 2, wherein responsive to the generated character connection indicator indicating the character as being a segmented character, said method further performing a character recognition of the character using a character recognition model.

5. The method of claim 1, wherein responsive to the generated character connection indicator indicating a connection to another adjacent character in the sequence, said method further comprising:
running, using the at least one hardware processor, an image processor adapted to split the connected characters of the sequence.

6. The method of claim 5, wherein said running an image processor adapted to split the connected characters comprises:
performing, using the at least one hardware processor, a first character splitting method using adaptive thresholding for image binarization, said first character splitting method dynamically adjusting a segmenting threshold for distinguishing among two classes of data used for character segmentation; or
performing a second character splitting method using a vertical histogram projection of said connected characters on an x-axis and locating a gap or trough on the projection as a location for character segmenting; or
performing both the first character splitting method and second character splitting method for segmenting the connected characters.

7. The method of claim 1, wherein said training said character adhesion classifier model uses single alphabet and numeric characters labels, said method further comprising:
adding random distance between two single characters to create new connected adhesion character data, wherein said character adhesion classifier model is further trained using said single characters and said new connected adhesion character data.

8. A system comprising at least one processor comprising hardware, the at least one processor configured to:
receive a digital image comprising a sequence of characters;
evaluate the digital image to determine a connectivity of one or more adjacent characters wherein to evaluate the digital image, said at least one processor is further configured to:
process the characters of the digital image to obtain character parameters; and
generate a connection indicator value of a character as a function of said character parameters, said generated character connection indicator indicating an uncertainty as to a character being connected to another character in the sequence; and responsive to the generated character connection indicator indicating an uncertainty as to a character being connected to another adjacent character in the sequence, said at least one processor is further configured to:
run a character adhesion classifier model trained to recognize, from said image, a presence or not of connected adjacent character classes of adjacent adhered characters of the sequence; and
for connected adjacent characters, perform image processing to incrementally split and segment the connected characters; and
perform character recognition to determine the sequence of characters including the segmented characters of the original digital image.

9. The system of claim 8, wherein
said generated character connection indicator alternatively indicating the character as being one of: a segmented character in the sequence, or a character connected to another character in the sequence.

10. The system of claim 9, wherein responsive to the generated character connection indicator indicating the character as being a segmented character, the at least one processor is further configured to:
perform a character recognition of the character using a character recognition model.

11. The system of claim 9, wherein
responsive to the generated character connection indicator indicating a connection to another adjacent character in the sequence, the at least one processor is further configured to:
run an image processor adapted to split the connected characters of the sequence.

12. The system of claim 11, wherein to run an image processor adapted to split the connected characters, the at least one processor is further configured to:
perform a first character splitting method using adaptive thresholding for image binarization, said first character splitting method dynamically adjusting a segmenting threshold for distinguishing among two classes of data used for character segmentation; or
perform a second character splitting method using a vertical histogram projection of said connected characters on an x-axis and locating a gap or trough on the projection as a location for character segmenting; or
perform both the first character splitting method and second character splitting method for segmenting the connected characters.

13. The system of claim 11, wherein said training said character adhesion classifier model uses single alphabet and numeric characters labels, said at least one processor is further configured to:
add random distance between two single characters to create new connected adhesion character data, wherein said character adhesion classifier model is further trained using said single characters and said new connected adhesion character data.

14. A non-transitory computer readable storage medium comprising instructions that, when executed by at least one processor comprising hardware, configures the at least one hardware processor to:
receive a digital image comprising a sequence of characters;
evaluate the digital image to determine a connectivity of one or more adjacent characters wherein to evaluate the digital image, said instructions further configuring said at least one processor to:
process the characters of the digital image to obtain character parameters; and
generate a connection indicator value of a character as a function of said character parameters, said generated character connection indicator indicating an uncertainty as to a character being connected to another character in the sequence; and responsive to the generated character connection indicator indicating an uncertainty as to a character being connected to another adjacent character in the sequence, said instructions further configuring said at least one processor to:
run a character adhesion classifier model trained to recognize, from said image, a presence or not of connected adjacent character classes of adjacent adhered characters of the sequence; and for connected adjacent characters, perform image processing to incrementally split and segment the connected characters; and perform character recognition to determine the sequence of characters including the segmented characters of the original digital image.

15. The non-transitory computer readable storage medium of claim 14, wherein said generated character connection indicator alternatively indicating the character as being one of: a segmented character in the sequence, or a character connected to another character in the sequence.

16. The non-transitory computer readable storage medium of claim 15, wherein responsive to the generated character connection indicator indicating the character as being a segmented character, the at least one processor is further configured to:

perform a character recognition of the character using a character recognition model.

17. The non-transitory computer readable storage medium of claim 15, wherein responsive to the generated character connection indicator indicating a connection to another adjacent character in the sequence, the at least one processor is further configured to:

run an image processor adapted to split the connected characters of the sequence.

18. The non-transitory computer readable storage medium of claim 17, wherein to run an image processor adapted to split the connected characters, the at least one processor is further configured to:

perform a first character splitting method using adaptive thresholding for image binarization, said first character splitting method dynamically adjusting a segmenting threshold for distinguishing among two classes of data used for character segmentation; or perform a second character splitting method using a vertical histogram projection of said connected characters on an x-axis and locating a gap or trough on the projection as a location for character segmenting; or perform both the first character splitting method and second character splitting method for segmenting the connected characters.

19. The non-transitory computer readable storage medium of claim 17, wherein said training said character adhesion classifier model uses single alphabet and numeric characters labels, said at least one processor is further configured to:

add random distance between two single characters to create new connected adhesion character data, wherein said character adhesion classifier model is further trained using said single characters and said new connected adhesion character data.

* * * * *